(12) United States Patent
Strait

(10) Patent No.: US 9,314,994 B2
(45) Date of Patent: Apr. 19, 2016

(54) PEDESTALED ROOF UNDERLAYMENT

(75) Inventor: Mark C. Strait, Simi Valley, CA (US)

(73) Assignee: Kirsch Research and Development, LLC, Simi Valley, CA (US)

( * ) Notice: Subject to any disclaimer, the term of this patent is extended or adjusted under 35 U.S.C. 154(b) by 0 days.

(21) Appl. No.: 13/426,109

(22) Filed: Mar. 21, 2012

(65) Prior Publication Data

US 2013/0247490 A1    Sep. 26, 2013

(51) Int. Cl.
*E04D 12/00*   (2006.01)
*B32B 5/02*    (2006.01)
*E04D 11/00*   (2006.01)
*B32B 5/26*    (2006.01)
*B32B 15/14*   (2006.01)
*B32B 27/12*   (2006.01)

(52) U.S. Cl.
CPC ............... *B32B 5/024* (2013.01); *B32B 5/022* (2013.01); *B32B 5/26* (2013.01); *B32B 15/14* (2013.01); *B32B 27/12* (2013.01); *E04D 11/002* (2013.01); *E04D 12/002* (2013.01); *B32B 2255/06* (2013.01); *B32B 2255/10* (2013.01); *B32B 2255/205* (2013.01); *B32B 2307/416* (2013.01); *B32B 2307/54* (2013.01); *B32B 2307/744* (2013.01); *B32B 2419/06* (2013.01); *Y10T 428/24612* (2015.01)

(58) Field of Classification Search
CPC ..... E04D 12/002; E04D 11/02; E04D 11/002; B32B 27/12; B32B 27/32; B32B 5/024; B32B 5/26; B32B 5/022; B32B 15/14; B32B 2255/10; B32B 2255/06; B32B 2255/205; B32B 2307/54; B32B 2307/416; B32B 2307/744; B32B 2419/06; E02D 31/02; Y10T 428/24612

USPC ........ 52/302.1, 408, 537, 177, 169.5; 428/59; 442/35

See application file for complete search history.

(56) References Cited

U.S. PATENT DOCUMENTS

| | | | |
|---|---|---|---|
| 3,663,350 A | | 5/1972 | Stokes |
| 4,361,614 A | * | 11/1982 | Moffitt, Jr. ................ 428/138 |
| 4,574,541 A | * | 3/1986 | Raidt et al. ................ 52/169.5 |
| 4,585,682 A | | 4/1986 | Colarusso et al. |
| 4,637,184 A | * | 1/1987 | Radtke et al. ............. 52/220.4 |
| 4,658,554 A | * | 4/1987 | Riley et al. ............... 52/309.8 |
| 4,712,349 A | * | 12/1987 | Riley et al. ................ 52/408 |

(Continued)

OTHER PUBLICATIONS

William R. Bridendolph and Douglas E. Powell, "Advancements in Polypropylene for Extrusion Coating", 2001 Polymers, Laminations & Coatings Conference, (2001) ten pages.

(Continued)

*Primary Examiner* — Robert Canfield
*Assistant Examiner* — Babajide Demuren
(74) *Attorney, Agent, or Firm* — Seed IP Law Group PLLC

(57) ABSTRACT

Pedestaled roof underlayment systems and methods are disclosed herein. A pedestaled roof underlayment system comprises a pedestaled sheet including a plurality of regularly spaced pedestals on one side and a generally flat surface on the other side. The system includes a multi-layer roofing underlayment including a slip resistant top layer, a UV protection layer and a strength layer. A reflective barrier layer may be included with the multi-layer roofing underlayment. The pedestaled sheet may be conical and/or tapered, and may have a top shape and cross section that may be circular, triangular, hexagonal and square.

29 Claims, 5 Drawing Sheets

(56) References Cited

U.S. PATENT DOCUMENTS

| | | | |
|---|---|---|---|
| 4,806,300 | A | 2/1989 | Walton et al. |
| 4,840,515 | A * | 6/1989 | Freese .................. 405/45 |
| 4,889,758 | A * | 12/1989 | Rinkewich ............... 428/178 |
| 4,923,733 | A * | 5/1990 | Herbst .................. 428/156 |
| 4,937,990 | A * | 7/1990 | Paquette ................ 52/199 |
| 4,943,185 | A * | 7/1990 | McGuckin et al. ........ 405/45 |
| 4,956,951 | A * | 9/1990 | Kannankeril ............. 52/169.5 |
| 5,052,161 | A * | 10/1991 | Whitacre ................ 52/385 |
| 5,067,298 | A * | 11/1991 | Petersen ................ 52/742.14 |
| 5,105,595 | A * | 4/1992 | Tokei et al. ............ 52/381 |
| 5,158,821 | A * | 10/1992 | Gebauer et al. .......... 428/174 |
| 5,255,482 | A * | 10/1993 | Whitacre ................ 52/390 |
| 5,369,926 | A * | 12/1994 | Borland ................. 52/302.1 |
| 5,383,314 | A * | 1/1995 | Rothberg ................ 52/169.5 |
| 5,444,959 | A * | 8/1995 | Tesch ................... 52/794.1 |
| 5,473,847 | A * | 12/1995 | Crookston ............... 52/302.1 |
| 5,489,462 | A * | 2/1996 | Sieber .................. 428/174 |
| 5,523,357 | A | 6/1996 | Peterson |
| 5,593,766 | A | 1/1997 | Woiceshyn |
| 5,692,348 | A * | 12/1997 | Ambrosino .............. 52/169.5 |
| 5,843,554 | A | 12/1998 | Katz |
| 5,979,133 | A | 11/1999 | Funkhouser |
| 6,103,642 | A * | 8/2000 | Arai et al. ............. 442/62 |
| 6,308,482 | B1 | 10/2001 | Strait |
| 6,468,615 | B2 | 10/2002 | Weinstein et al. |
| 6,557,313 | B1 * | 5/2003 | Alderman ................ 52/407.3 |
| 6,623,840 | B2 * | 9/2003 | Hainbach ................ 428/172 |
| 6,684,579 | B2 * | 2/2004 | Brunson et al. .......... 52/169.5 |
| 6,691,472 | B2 * | 2/2004 | Hubert .................. 52/169.5 |
| 6,769,215 | B1 * | 8/2004 | Carkner ................. 52/411 |
| 6,786,013 | B2 * | 9/2004 | Coulton ................. 52/198 |
| 6,925,765 | B2 | 8/2005 | Fay et al. |
| 6,925,766 | B2 | 8/2005 | Di Pede |
| 7,520,097 | B2 * | 4/2009 | Aalbers et al. .......... 52/302.1 |
| 7,585,556 | B2 * | 9/2009 | Julton .................. 428/156 |
| 7,698,858 | B2 | 4/2010 | Schroer et al. |
| 7,757,447 | B2 * | 7/2010 | Aalbers et al. .......... 52/302.1 |
| 7,786,028 | B2 * | 8/2010 | Souther et al. .......... 442/85 |
| 2003/0209305 | A1 * | 11/2003 | Smith et al. ............ 156/71 |
| 2004/0127120 | A1 | 7/2004 | Zanchetta et al. |
| 2004/0148887 | A1 * | 8/2004 | Di Pede ................. 52/408 |
| 2005/0074586 | A1 * | 4/2005 | Skaja ................... 428/174 |
| 2007/0178784 | A1 | 8/2007 | Jones et al. |
| 2008/0020662 | A1 * | 1/2008 | Strait .................. 442/43 |
| 2008/0086958 | A1 * | 4/2008 | Schroer et al. .......... 52/169.14 |
| 2009/0320399 | A1 * | 12/2009 | Ehrman et al. ........... 52/309.13 |
| 2012/0164906 | A1 * | 6/2012 | Yahiaoui et al. ......... 442/376 |

OTHER PUBLICATIONS

James R. Beren, "Heterophasic Polypropylene Copolymer Resins for Extrusion Coating", 1994 Polymers, Laminations & Coatings Conference, (1994) pp. 97-102.

James R. Beren and Vito V. DE3MAIO, "On-Line Melt Strength Enhancement of Polypropylene for Extrusion Coating", 2000 Polymers, Laminations & Coatings Conference, (2000), five pages.

Ananda M. Chatterjee, "Resin and Molecular Weight Distribution Effects on extrusion Coating of Polypropylene", copyright 1999 by Union Carbide Chemicals & Plastics Technology Corporation, (1999) eight pages.

Aquacheck D.S., Specification Information Green Roof Board, revised Apr. 20, 2010.

Delta, Effective Dampproofing and Wall Waterproofing Membrane, http://www.cosella-dorken.com/bvf-ca-en/products/foundation_residential/dimplesheets/products/ms.php, accessed on Mar. 21, 2012.

Applied Technologies LLC, DrainGuard Foundation Water Drainage Composite, http://www.appliedtechnologies.com/home/drainguard_foundation_water_dr.html, accessed Mar. 21, 2012.

Resch Enterprises, Dimple Board Membrane, http://dry-up-basement.com/waterproofing-dimple-boards.htm, Accessed Mar. 21, 2012.

Superseal Construction Products Ltd., Superseal Dimpled Membrane, http://www.superseal.ca/dimpledmembrane.html, accessed Mar. 21, 2012.

Amvic Pacific, Tech Bulletin: Waterproofing ICF Basements, http://amvic-pacific.com/Downloads/Tech%20Bulletin%20-%20Waterproofing%20ICF%20Basements.pdf, accessed Mar. 21, 2012.

* cited by examiner

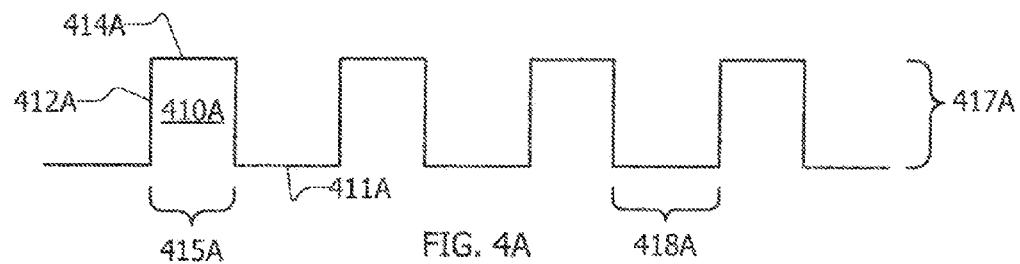
FIG. 4A
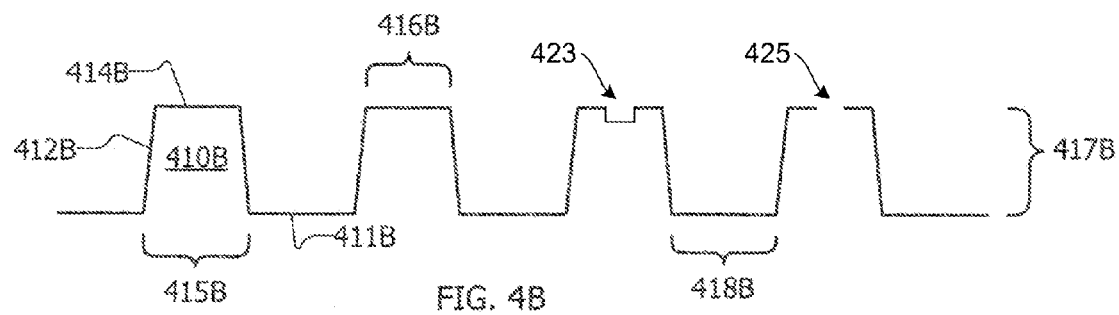
FIG. 4B
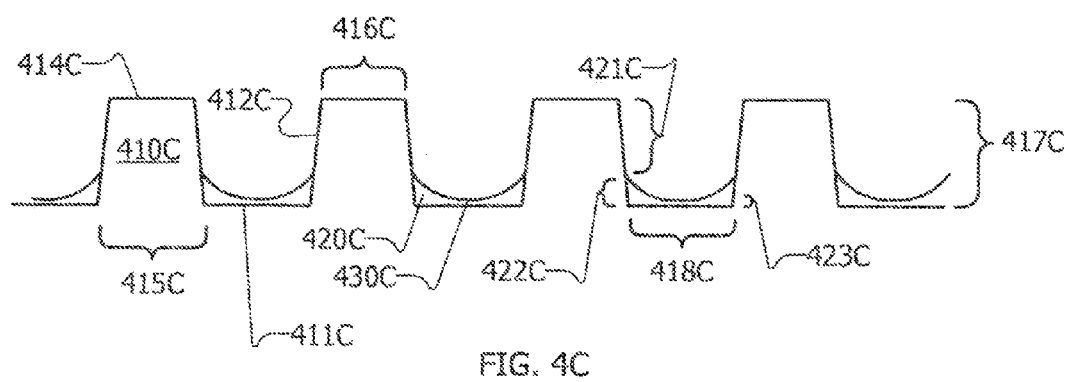
FIG. 4C
FIG. 4

PEDESTALED ROOF UNDERLAYMENT

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

RELATED APPLICATION INFORMATION

This patent is related to U.S. patent application Ser. No. 11/459,265 filed Jul. 21, 2006 and U.S. Pat. No. 6,308,482 issued Oct. 30, 2001, both of which are incorporated herein by reference in their entirety.

BACKGROUND

1. Field

This disclosure relates an underlayment for a roof structure, and more specifically, to a pedestaled roof underlayment system.

2. Description of the Related Art

Roofing structures for buildings typically include an underlayment positioned between a roof support deck and an overlayment. The overlayment, such as asphalt shingles, tiles, wooden shakes, slate tiles, metal roofing, steep-pitch polyurethane spray foam systems, or the like for roofs, is intended to provide protection from external weather conditions like wind, rainwater, and snowmelt. The underlayment is installed between the roof deck structure and the overlayment, and it further protects against moisture and other elements which may pass under the overlayment. Traditional roofing construction does not provide for above sheathing ventilation.

DESCRIPTION OF THE DRAWINGS

FIGS. 4A, 4B and 4C are enlarged, cross-sectional views of example pedestaled roofing sheet configurations.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Pedestaled roof underlayment systems and methods are disclosed herein. In one embodiment, the air gap between the primary roof covering created by the pedestaled roof underlayment system described herein adds an insulation value and allows for the removal of hot air generated by the primary roof covering as an above sheathing or structure ventilation system. With the current demand for electricity in the United Stated increasing three times faster than the speed at which power plants and lines being built, new designs in the building envelope will be necessary to provide a hedge toward increasing utilities bills, especially for people living in older homes and buildings built when energy costs were relatively low and insulation and energy saving construction technology was not in vogue.

A system described herein includes a pedestaled sheet laid on a roof deck structure. A high tensile strength multi-layer roofing underlayment may be laid over the pedestaled sheet. Or the pedestaled sheet may have a multi-layer roofing underlayment affixed thereto. The pedestaled sheet may have an anti-slide layer applied to the roof facing side. The combination of the pedestaled sheet and multi-layer reflective roofing underlayment are attached to the roof deck structure by nails or screws which may be augmented with washers or plates. Primary, finished roofing products are installed over the combination of the pedestaled sheet and multi-layer roofing underlayment. Depending on the embodiment, the reflective side may be installed facing up or down, that is away from or against the roof deck structure.

Figure 1:
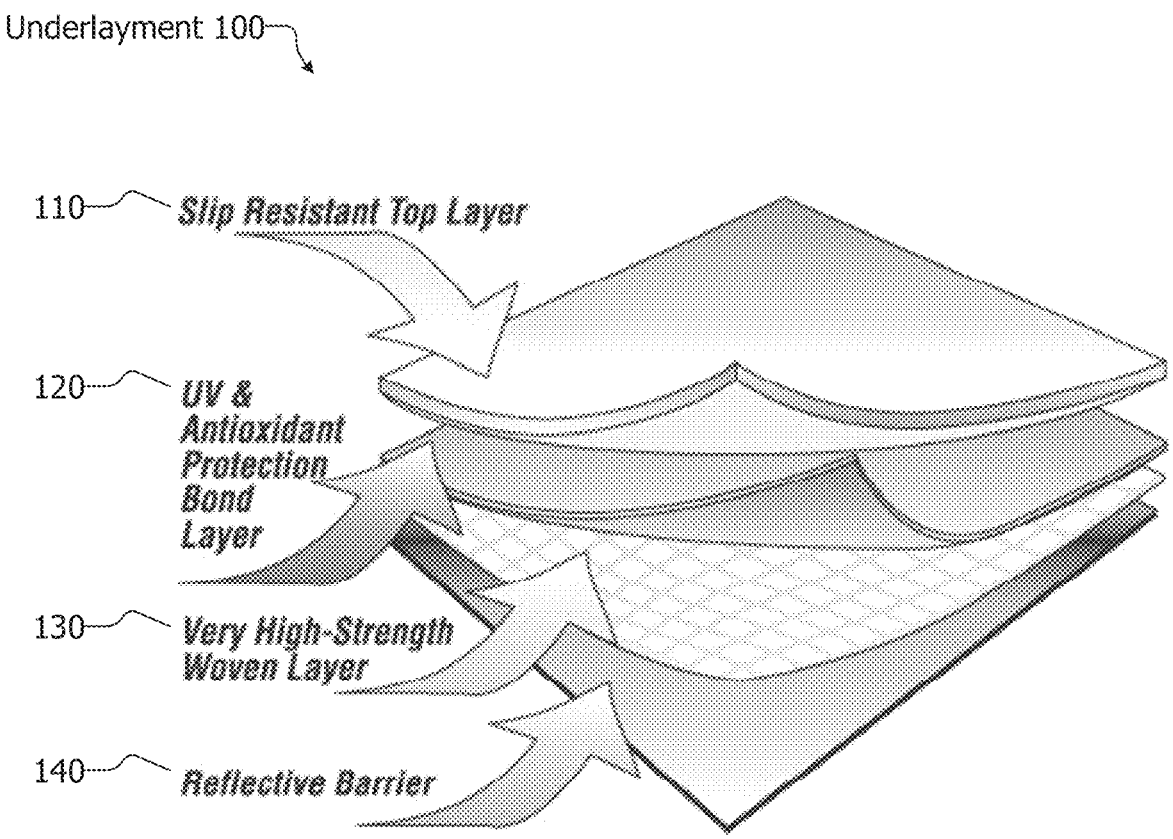
FIG. 1 is a perspective view of an example multi-layer roofing underlayment.

FIG. 1 is a perspective view of an example multi-layer roofing underlayment 100. The roofing underlayment may have multiple layers, each layer serving a particular purpose. The multi-layer roofing underlayment 100 may include a slip resistant top layer 110, a UV protection, anti-oxidant protection, water resistant and bonding layer 120, a high strength woven layer 130, and a reflective barrier layer 140. The slip resistant top layer 110 may be made from a non-woven polypropylene fabric such as spun-bond polypropylene, polyester or other non-woven materials, The UV protection, anti-oxidant, coating, water resistant and bonding layer 120. The high strength woven (or non-woven) layer 130 may be woven from strands of a thermoplastic polymer, such as polypropylene, polyethylene, polyester, nylon, thermoplastic polyolefin (TPO) (or nonwoven fabric made from spun bound or needle punch polypropylene or polyester fibersbonded together by chemical, mechanical, heat or solvent treatment, or other similar material). The reflective barrier layer 140 may be made from, for example, metalized or metallic film, aluminum foil, copper foil, metalized polyester, metallized polyethylene including linear low-density polyethylene (LLDP), PET, MET-PET, and others. The water resistant layer may be made from a thermoplastic film such as polyethylene, polypropylene, TPO and other thermoplastic polymers. The layers may be combined using a combination of extrusion lamination, heat and pressure, which presses the non-woven layer into the coating layer providing for a slip-resistant surface with a high co-efficient of friction while reducing the loose fiber detachment resulting from abrasion and foot traffic as well as providing an anchor for polyurethane adhesive attachment and the like. The resulting sheet will not delaminate or otherwise separate. The multi-layer roofing underlayment is formed to be flexible and may be stored as a roll.

In various embodiments, some of the layers are used, all of the layers are used, and multiple instances of some layers are used. For example, a UV protection, anti-oxidant protection, water resistant and bonding layer may be provided between the reflective barrier 140 and the high strength woven layer 130. For example, one or more additional UV protection, anti-oxidant protection, high strength woven, water resistant and/or bonding layers may be provided between or combined with any of the shown layers 110, 120, 130 and 140.

Versions of layered underlayment and methods for making some versions of multi-layer roofing underlayment are described in co-owned U.S. patent application Ser. No. 11/459,265 filed Jul. 21, 2006 and U.S. Pat. No. 6,308,482 issued Oct. 30, 2001, both of which are incorporated herein by reference in their entirety.

Figure 2A:
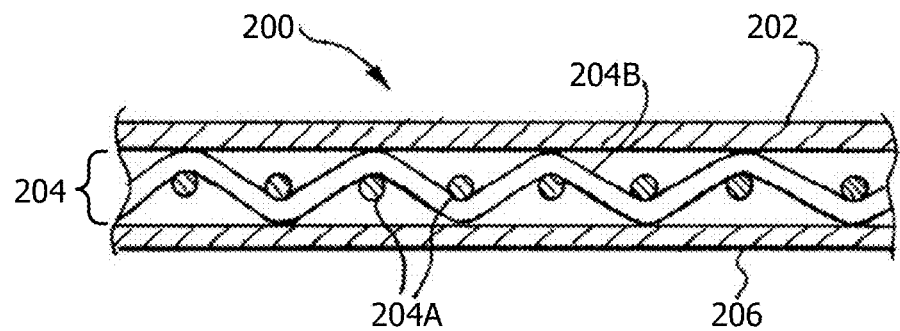
FIGS. 2A, 2B and 2C are enlarged, cross-sectional views of, respectively, an example roofing underlayment, a first example slip-resistant roofing underlayment, and a second example slip-resistant roofing underlayment.
Figure 2B:
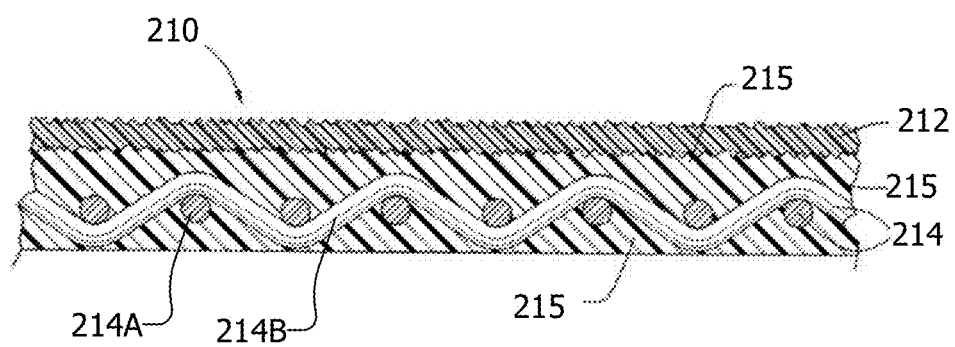
Figure 2C:
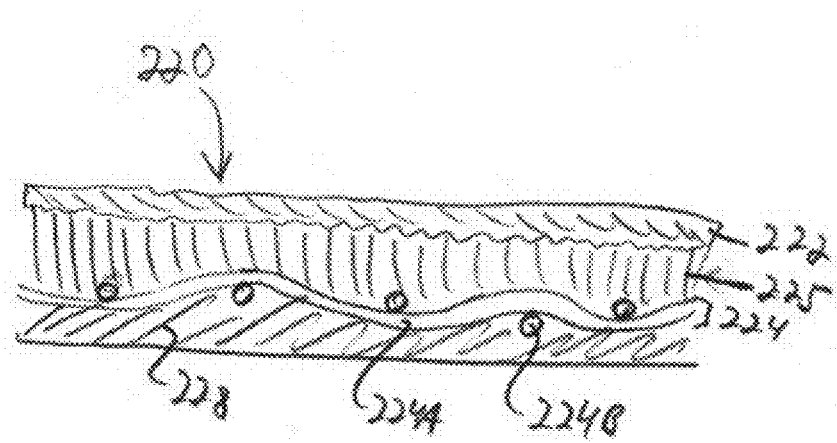

FIGS. 2A, 2B and 2C are enlarged, cross-sectional views of example multi-layer roofing underlayments. Referring now to FIG. 2A, an enlarged, cross-sectional view of an example multi-layer roofing underlayment 200 is shown. The multi-layer roofing underlayment includes a reinforcing scrim 204 having a layer of waterproof material 202 affixed to at least one of its sides. Layers of waterproof material 202 and 206 may be affixed to both sides of the reinforcing scrim 204. The reinforcing scrim 204 is formed of a mesh of individual, interwoven strands 204A and 204B of material or a or non-woven scrim having a tensile strength sufficient to resist tearing when exposed to tensile loads from various directions. The interwoven strands 204A and 204B of the reinforcing scrim 204 may be formed of a thermoplastic polymer, such as polypropylene, polyethylene, polyester, nylon or other similar material. The strands 204A and 204B are interwoven to provide a reinforcing scrim 204 having an improved tensile strength not achievable with solid film material or asphalt tar paper underlayments. The strands 204A and 204B are selected to optimize their tensile strength. The strands 204A and 204B may be any cross-sectional shape and size, depending upon the desired tensile characteristics of the scrim 204. The strands 204A and 204B may be interwoven fibers (as shown), may be cross-laminated polyethylene tape, polypropylene tape, and or non-woven's such as polypropylene or polyester spun bond or staple process and may include other interwoven configurations. When the reinforcing scrim 204 is a non-woven material, it may be thermally bonded and/or pressed to the adjacent layers to provide a reinforcing scrim 204 having an improved tensile strength not achievable with solid film material or asphalt tar paper underlayments.

The layers of waterproof material 202 and 206 affixed to both sides of the reinforcing scrim 204 provide a weather-resistant barrier which prevents moisture and other external elements from passing through the multi-layer roofing underlayment 200. In this example, the waterproof material 202 and 206 is a layer of thermoplastic coating which is extruded over each side of the scrim 204, so that the reinforcing scrim 204 is sandwiched between the two thermoplastic layers 202 and 206. This example multi-layer roofing underlayment 200 has thermoplastic layers 202 and 206 positioned over each side of the reinforcing scrim 204. In other configurations, the reinforcing scrim 204 may have only one of its sides coated with a thermoplastic layer. The thermoplastic layer 202 and 204 may be polyethylene, polypropylene, or other thermoplastic polymers.

The multi-layer roofing underlayment 200 may be formed by co-extruding layers of thermoplastic film 202 and 206 over and under the reinforcing scrim 204. In addition, the thermoplastic layers 202 and 206 may be affixed to the reinforcing scrim 204 using an adhesive or other manner of attachment. The thermoplastic layers 202 and 206 may be pigmented to allow the color of the thermoplastic layers 202 and 206 to be selected based upon a customer/user requirements. The thickness of the thermoplastic layers 202 and 206 is selected such that the multi-layer roofing underlayment 200 is flexible. The flexible nature of the multi-layer roofing underlayment 200 allows it be formed into rolls. In this way, the multi-layer roofing underlayment 200 may be installed by unrolling the multi-layer roofing underlayment 200 over a pedestaled sheet 300 or over a roof support structure.

Referring now to FIG. 2B, an enlarged, cross-sectional view of first example slip resistant multi-layer roofing underlayment 210 is shown. The multi-layer roofing underlayment 210 comprises a scrim 214 woven or non-woven from polypropylene or polyester tapes or fibers respectively, a top layer 212 made from a non-woven polypropylene or polyester fabric (spun-bond polypropylene or polyester), and a polypropylene coating 215 applied between the scrim 214 (that includes woven or non-woven strands/fibers 214A and 214B) and the top layer 212 so as to bond the scrim 214 and the top layer 212 together. The thicknesses of the scrim fabric 214 and the top layer 212 are selected depending on the needs of the particular roofing application.

During lamination, as described below, the polypropylene coating 215 is impregnated into the weaves of the scrim 214, creating a structural bottom layer comprising the scrim impregnated with the polypropylene coating. This impregnation of the scrim 214 with the polypropylene coating 215 also provides an improved bonding with the non-woven fabric of the top layer 212, thereby reducing the chances of delamination. Further, the top layer 212 is pressed deeply into the coating 215 during the lamination process, further strengthening the bond between the top layer 212 and the scrim 214. The non-woven fibers of the spun-bond top layer 212 provide a micro-textured surface that is water resistant as well as slip-resistant, even when exposed to moisture, such as rain or dew, or when covered with debris, such as dust, dirt, ceramic granules from asphalt shingles and other small particles of material.

In addition to being slip resistant, this example the multi-layer roofing underlayment 210 is resistant to thermal expansion and contraction, wrinkling, absorbing moisture, scarring and melting. The multi-layer roofing underlayment 210 can withstand high temperatures in excess of 300° F. without softening. The multi-layer roofing underlayment 210 is ultra-violet resistant. And the multi-layer roofing underlayment 210 contains antioxidants for long term resistance to heat. Further, the multi-layer roofing underlayment 210 resists rotting, drying out, or becoming brittle. The multi-layer roofing underlayment 210 also provides added protection against high winds and hail. The multi-layer roofing underlayment 210 is light in weight, at about 40-60 lbs. per typical 4 ft.×250 ft. roll.

By using the combination multi-layer roofing underlayment 210 and pedestaled sheet when installing final roofing products such as asphalt shingle, the life of the roof is enhanced. The multi-layer roofing underlayment 210 provides long-term moisture protection, improved durability wind resistance, enhanced elimination of blow-off, and improved resistance to hail damage with or without the pedestaled sheet. The multi-layer roofing underlayment 210 is thermally stable, with a melting point of 320° F., and is approved as an alternate to Type 15 and Type 30 roofing felts (asphalt coated paper).

The top layer 212 may advantageously be white or grey in color, as these colors keep the underlayment up to 30% cooler for workers and keep buildings cooler during construction in summer months, while black may be used for construction in winter months to help increase snow and ice melt from the roof. Additives may be added to the coating and/or any of the layers to protect the underlayment 2 from sun damage, and temperature cycling. Such additives may include, for example, ultra-violet protective additives to protect the underlayment while exposed prior to installation of the primary roof coverings and anti-oxidants to resist oxidation from heat cycling after the primary roof covering is installed. Additionally, additives as known to those in the industry, to improve high and low temperature performance of the polypropylene resin formulation. These and other additives are well-known in the plastic additive industry, and are commercially available from companies such as Eastman Chemical Company of Kingsport, Tenn. and Techmer PM of Clinton, Tenn., and others.

Referring now to FIG. 2C, an enlarged, cross-sectional view of a second example slip resistant multi-layer roofing underlayment 220 is shown. The multi-layer roofing underlayment 220 of the second embodiment comprises a scrim 224 that is woven from polypropylene or non-woven tapes or fibers respectively 224A and 224B, a top layer 222 made from a non-woven, spun-bond polypropylene or polyester fabric, and a polypropylene coating 225 applied between the top layer 222 and the scrim 224. The polypropylene coating 225 impregnates the fabric weave of the scrim 224 and bonds the top layer 222 and the scrim 224 together. The scrim 224 may be made from a heavier woven or non-woven fabric than the scrim 214 shown and described regarding FIG. 2B, although the scrim 214 can be made using the heavier woven or non-woven fabric as needed to improve abrasion resistance and tensile strength, and to allow for installation using standard ⅜" EG roofing nails.

The multi-layer roofing underlayment 220 shown in FIG. 2C is distinguished from the multi-layer roofing underlayment 210 shown in FIG. 2B by the addition of a second polypropylene coating 228 on the bottom surface of the polypropylene-impregnated scrim 224. The polypropylene coating 228 may be applied in liquid form and/or via extrusion lamination. The addition of the coating 228 further strengthens the multi-layer roofing underlayment 220, increases its abrasion resistance, and provides for a synthetic roof underlayment that, when mechanically fastened with nails and/or screws (and/or other fasteners such as staples and rivets), provides sealability per ASTM D 1970 and per ICC-ES AC 48 Severe Weather Climate Roof Underlayment standards. The multi-layer roofing underlayment 220 may be configured and manufactured so that the resulting product is breathable. As used herein, "breathable" refers to a multi-layer roofing underlayment that is microporous and allows the passage of water molecules such as water vapor and/or steam. An example breathable multi-layer roofing underlayment has a water vapor transmission rate (WVTR) of greater than about 50 g/m$^2$-24 hr, as measured by ASTM E96A, and may have a WTVR of, for example, in various embodiments, 75, 100, 150 or 180 g/m$^2$-24 hr. A breathable multi-layer roofing underlayment may be made according to the methods described in U.S. patent publication US20070178784. Other breathable multi-layer roofing underlayments may be used.

The multi-layer roofing underlayment 220 is slip-resistant, as well as resistant to thermal expansion and contraction, wrinkling, absorbing moisture, scarring, and melting. The multi-layer roofing underlayment 220 withstands high temperatures, and resists rotting, drying out, and becoming brittle. The multi-layer roofing underlayment may be used with and is compatible with sprayed adhesive. The multi-layer roofing underlayment 220 also provides added protection against wind and hail. The multi-layer roofing underlayment 220 is relatively light in weight, at about 30-50 lbs. per typical 4 ft. by 250 ft. roll.

Figure 3:
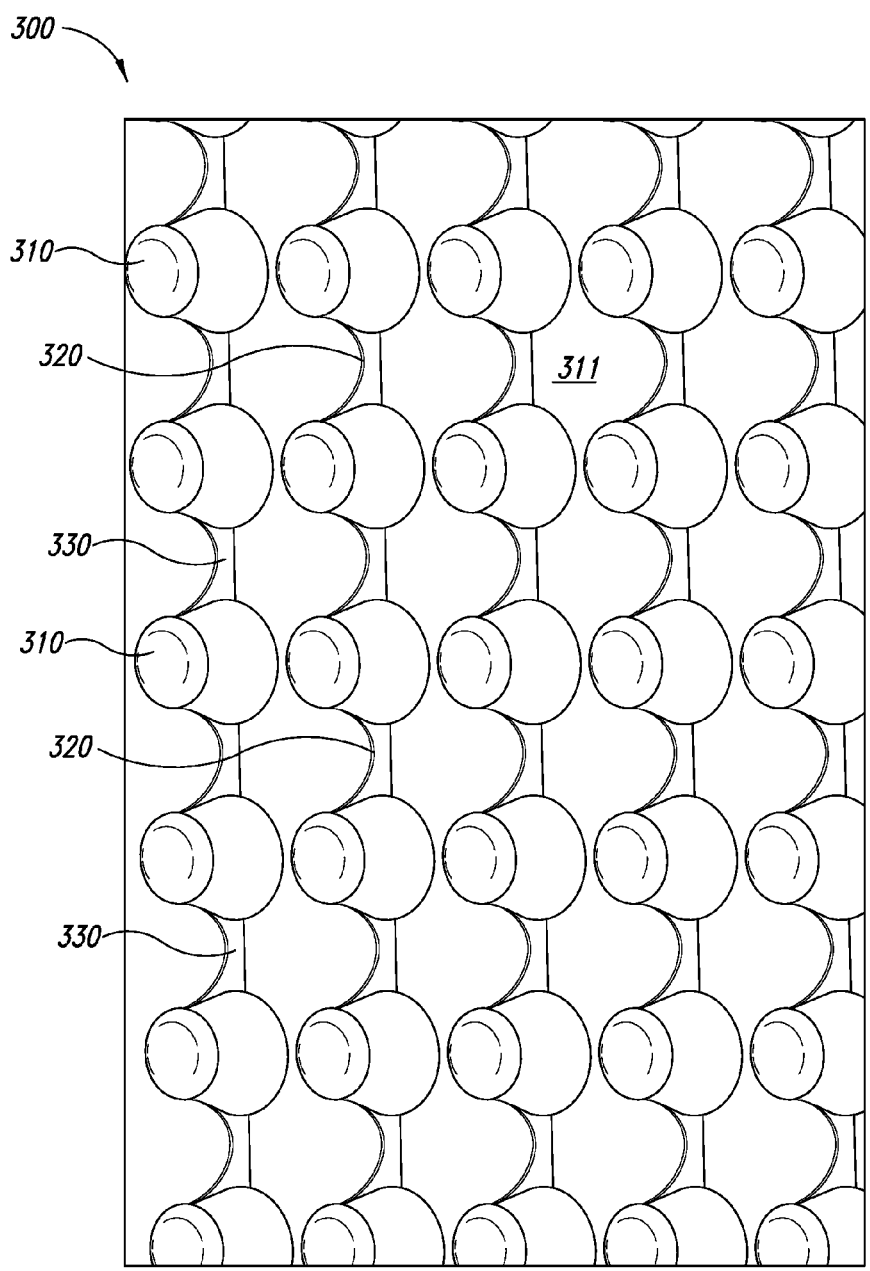
FIG. 3 is a perspective view of an example pedestaled roofing sheet.

FIG. 3 is a perspective view of an example pedestaled roofing roofing sheet, pedestaled sheet 300. The pedestaled roofing sheet includes an impermeable polymeric sheet cuspated under heat and pressure to form multiple nodes, nodules, knobs, protuberances, cylindrical extensions, cylindrical projections which shall be referred to herein by the shorthand pedestals. As such, the pedestaled roofing sheet is referred to for ease of reference as a pedestaled sheet. The pedestaled sheet 300 includes a plurality of pedestals 310 which may be arranged as a matrix having rows and columns. The pedestals 310 may be generally cylindrical projections from a base sheet 311. The pedestals 310 may have a top that is generally flat. The pedestals 310 may have a top that is generally flat and is curved or rounded where it meets the pedestal's side. The pedestals 310 may have sides that are generally perpendicular to the base sheet 311 and the pedestal top. The pedestals 310 may have sides that are slightly angled where the sides meet the top and the base sheet 311, such that the diameter and circumference at the top of the pedestal is smaller than the diameter and circumference of the pedestal where is meets the base sheet 311. In this way the pedestals may be considered tapered as the diameter of the pedestal gradually minimally decreases the further from the base sheet.

The pedestals are typically uniform in size and shape. The pedestals may be from 0.25" to 1.00" in height. The diameter of the top of the pedestals may be from 0.25" to 0.375" When the pedestal is tapered, the diameter of the base area of the pedestals may be from ⅜" to ¹⁵⁄₁₆" and the distance between the base of the pedestals may be from 0.188" to 0.4" and the diagonal distance between the base of the pedestals may be from ⅝" to ¾". The compressive strength of the pedestaled sheet 300 may be 9500 psf to 33,000 psf per ASTM D-1621 as necessary based upon load requirements of the primary roof covering and other design criteria.

The pedestaled sheet 300 may have a thickness at its base of between 20-80 mils. In other embodiments, the pedestaled sheet 300 may have other thicknesses at its base. The pedestaled sheet 300 is preferably sufficiently pliable so that it may be delivered in rolls. The weight per 4'×50' roll of pedestaled sheet may be, for example, from 38 to 88 lbs.

The pedestals may have a circular top. The pedestals may have tops of other geometric shapes, including but not limited to triangular, star, hexagonal, and square. Certain portions of the sides or walls of the pedestals may have a reinforcing arc or arch 320 included therein. The reinforcing arches are located where the sides of the pedestal meets the base sheet. The reinforcing arches may reach from approximately 5% to 50% of the height of the pedestal. The reinforcing arches of neighboring pedestals may be coupled to one another by a reinforcing bridge 330. The reinforcing arches 320 and bridges 330 may be provided along all rows, all columns, some rows, some columns or a combination of these.

The sides of the pedestals may be grooved or ridged to add further strength, that is, so that the pedestals can support a greater load or weight.

The tops of the pedestals may be may be textured or non-smooth to provide a slip resistant surface. In this way, when a multilayer underlayment is placed above the pedestaled sheet, the underlayment will not slip or slide. The tops of the pedestals may also be indented 423 or have one or more a small holes or openings 425 to provide for improved adhesive attachment to the multi-layer underlayment. The underside of the pedestaled sheet (that is, the side opposite the pedestals) may include or be textured or non-smooth to provide a slip resistant surface. In this way, the likelihood that the pedestaled sheet will slip or slide when placed on a wood, cementitious fiberglass boards, concrete or metal roof deck is decreased.

In one embodiment, the underside of the pedestaled sheet (that is, the side opposite the pedestals) may have a rubberized or other non-slip or slip resistant coating applied thereto. In this way, the likelihood that the pedestaled sheet will slip or slide when placed on a wood, cementitious fiberglass boards, concrete or metal roof deck is decreased.

The pedestaled sheet 300 and the pedestals must be sufficiently strong to elevate and support a multilayered underlayment, roofing material, and a man's weight plus tools and materials he may carry. The pedestaled sheet 300 is made from sufficiently strong and resilient material or materials, such as, for example, high impact polystyrene (HIPS) and/or high density polyethylene (HDPE) and/or polypropylene. Other materials that could be used in addition or in place of these include polyvinyl chloride (PVC), plastic, polyethylene, polystyrene, polypropylene, and other thermoplastics.

The pedestaled sheet 300 is used to create an air space above a roof deck and below the roofing material; that is, under asphalt shingles, tiles, slates, and metal roofing systems and the like. The pedestaled sheet 300 may be placed between a multilayered roofing underlayment (such as that shown in and described regarding FIGS. 1, 2A, 2B, 2C) and the roofing material or between a multilayered roofing underlayment (such as that shown in and described regarding FIGS. 1, 2A, 2B, 2C) and the roof deck. The air space created by the pedestaled sheet 300 can be increased by increasing the height of the pedestals, and/or by the arrangement of the pedestals. The net free ventilation area (NFVA) per lineal foot (12") of the pedestaled sheet per 4'×50' roll may be 1.25 to 8 square inches depending on pedestal dimensions.

In one embodiment, when used in a non-vented configuration, the air gap created by the pedestaled sheet 300 reflects thermal radiation thereby reducing radiant heat transfer. In another embodiment, when used in a vented configuration, the pedestaled sheet 300 insulates and removes hot air generated by the primary roof covering when installed as an above sheathing ventilation system. The insulating advantages of a roofing underlayment system that includes a pedestaled sheet are enhanced when paired with a layered reflective underlayment 540 shown and described below regarding FIG. 5. The addition of a high reflectance low emittance layer combined with an above sheathing ventilation structure such as pedestaled sheet 300 adds an energy saving component that greatly reduces radiant heat transmission by reflecting thermal radiation thereby reducing radiant heat transfer into the attic cavity.

The pedestaled sheet may have a metalized reflectant coating of aluminum, copper or other low emittance materials on either side of the sheet, depending on alignment and use, to further reduce radiant heat transmission by reflecting thermal radiation.

The pedestaled sheet 300 may have a fire retardant as part of its polymer composition, as a layer affixed or combined therewith on the non-pedestaled or back side or included with a layered underlayment 540 (such as that shown in and described regarding FIGS. 1, 2A, 2B, 2C). The pedestaled sheet 300 must be sufficiently strong so as to support the weight of the primary roof covering, those walking directly on the pedestaled sheet, and those walking over the finished roof covering when it is installed over the pedestaled sheet. The pedestaled sheet 300 should meet national building codes. The pedestaled sheet 300 may have a rubberized or non-slip layer affixed or combined therewith on the non-pedestaled or back side so that the sheet does not slide on roof decks when workers walk on the sheet during installation. The pedestaled sheet 300 may be installed in multiple layers. The pedestaled sheet may have plywood, OSB board, DensDeck® from Georgia Pacific and or other roof deck materials installed over it as building and fire codes may require and/or permit.

FIGS. 4A, 4B and 4C are enlarged, cross-sectional views of example pedestaled roofing sheet configurations. The pedestals on the pedestaled sheet may take various forms. The pedestaled sheet cross section shown in FIG. 4A includes cylindrical pedestals 410A having a generally flat top 414A and straight sides 412A. The sides 412A are at an approximate right angle with the top 414A and the sheet base 411A. The space 418A between the pedestals 410A may be generally the same as the height 417A of the pedestals 410A, may be larger than the height 417A of the pedestals 410A, or may be smaller than the height 417A of the pedestals 410A.

The pedestaled sheet cross section shown in FIG. 4B includes generally cylindrical pedestals 410B having a generally flat top 414B and sides 412B slightly angled out from the diameter or width of the top 414B to the location where the side 412B meets the base 411B. This tapered pedestal has a top width 416B that is smaller than the base width 415B. The angled sides 412B provide additional strength and support so that the pedestaled sheet can withstand a heaver load than a pure cylindrical pedestal. As shown, the sides 412B are at approximately 94°, 95° or 96° angle with the sheet base 411B and the pedestal top 414B. In similar embodiments, the pedestal may be more conical such that the angle from the sides to the sheet base and the pedestal top is approximately 110°. The space 418B between the pedestals 410B may be generally the same as the height 417B of the pedestals 410B, may be larger than the height 417B of the pedestals 410B, or may be smaller than the height 417B of the pedestals 410B.

The pedestaled sheet cross section shown in FIG. 4C includes generally cylindrical pedestals 410C having a generally flat top 414C and sides 412C slightly angled out from the diameter or width of the top 414C to the location where the side 412C meets the base. This tapered pedestal has a top width 416C that is smaller than the base width 415C. The angled sides 412C provide additional strength and support so that the pedestaled sheet can withstand a heaver load than a pure cylindrical pedestal. As shown, the sides 412C are at approximately 95° or 96° angle with the sheet base 411C and the pedestal top 414C. In similar embodiments, the pedestal may be more conical such that the angle from the sides to the sheet base and the pedestal top is approximately 110°. The space 418C between the pedestals 410C may be generally the same as the height 417C of the pedestals 410C, may be larger than the height 417C of the pedestals 410C, or may be smaller than the height 417C of the pedestals 410C.

In addition, to add further strength to the pedestals, sides 412C or walls of the pedestals 410C may have a reinforcing arc or arch 420C included therein. The reinforcing arches 420C are located where the sides of the pedestal meet the base sheet 411C. The reinforcing arches may reach from approximately 5% to 50% of the height of the pedestal 417C, shown as arch height 422C. The reinforcing arches 420C of neighboring pedestals may be coupled to one another by a reinforcing bridge 430C. The reinforcing arches 420C and bridges 430C may be provided along all rows, all columns, some rows, some columns or a combination of these. The reinforcing bridges 430C may be approximately 2% to 20% of the height of the pedestals 417C, shown as bridge height 423C. Although shown together, the reinforcing arches 420C may be used separately without reinforcing bridges 430C, and the reinforcing bridges 430C may be used separately without reinforcing arches 420C.

In various embodiments, the pedestaled sheet may have conical pedestals, and rectangular, triangular, hexagonal, circular or square topped pedestals.

Figure 5:
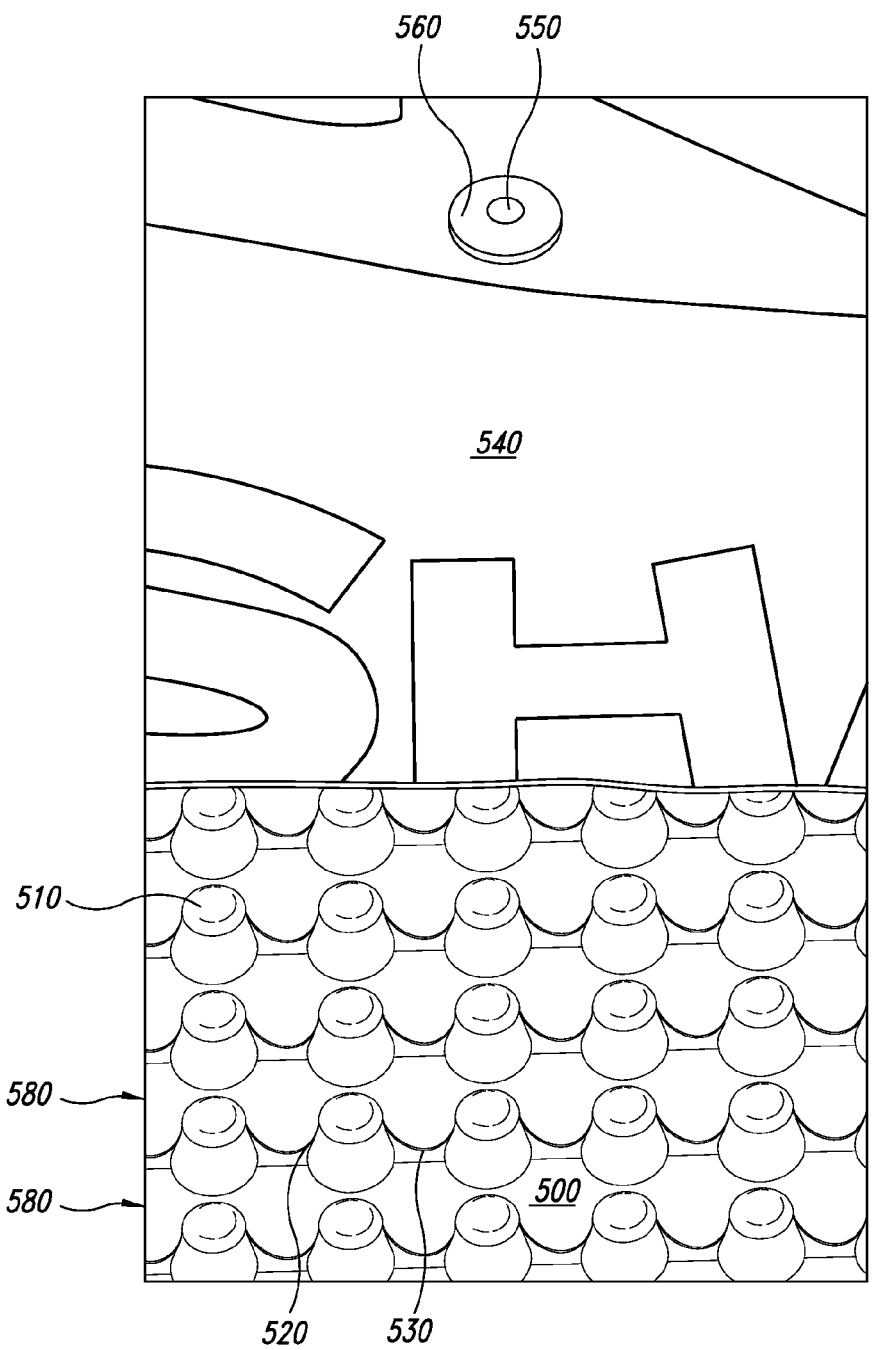
FIG. 5 is a perspective view of an example multi-layer roofing underlayment and pedestaled roofing sheet showing a nail and washer for attachment to a roof support deck or structure.

FIG. 5 is a perspective view of an example multi-layer roofing underlayment 540 and pedestaled sheet 500 showing a nail 550 and washer 560 for attachment to a roof support deck. In one embodiment, the roofing underlayment 540 is pre-attached to the tops of the pedestals 510 of the pedestaled roofing sheet 500 by glue or other adhesive and/or ultrasonic welding. In another embodiment the roof underlayment is pre-attached to the tops of the pedestals 510 of the pedestaled roofing sheet 500 by glue or other adhesive and/or ultrasonic welding such that the roof underlayment extends beyond the width and length of the pedestaled sheet to allow the installer to overlap the roof underlayment over the previous course of the installed roof underlayment/pedestaled sheet system to allow for and maintain the water resistant integrity of the overall system. In another embodiment, the roofing underlayment 540 is rolled out or otherwise placed above or on top of the pedestaled sheet 500.

Although roofing underlayment 540 may have multiple (that is, three or more) layers, an underlayment with only a single or only two layers may be used.

The pedestaled sheet/underlayment combination 540/500 is fastened or affixed to the plywood, OSB or other sheathing material. This may be achieved by hammering nails 550 through the pedestaled sheet/underlayment combination. The nails may be wide headed to hold the layered underlayment 540 down against the pedestaled sheet 500 and to the roof deck. The nails or staples 550 may be installed through or include a washer 560 made of plastic, metal (such as anodized aluminum, zinc, and others), composite material, or other resilient material that can withstand temperature fluctuations and moisture. The washer 560 allows the nail 550 to hold the layered underlayment down against the pedestaled sheet and to the roof deck.

Screws and metal plates as used in the industry to attach polyisocyanurate or polystyrene insulation, may be used to attach the reflective pedestaled sheet to wood, metal or cementitious fiberglass roof decks. Polyurethane adhesives and other adhesives and the like as used in the industry to adhere polyisocyanurate, polystryrene and other insulation boards to metal, concrete, cementitious fiberglass and wood roof decks can be used to attach the reflective pedestaled sheet in this manner as well.

If the pedestaled sheet 500 includes both reinforcing arches 520 and reinforcing bridges 530 along some or all rows pedestals 510, then a moisture or water channel 580 is formed. The resulting channels 580 should be aligned appropriately to enhance roofing drainage. That is, the pedestaled sheet 500 should be installed with the channel 580 aligned from the roof peak to the roof edge.

In practice, the pedestaled roofing system may be installed in the following manner. On an existing building already having roofing material applied, the existing roofing material is removed so that the existing solid roof deck is exposed. In addition, damaged or dry-rotted wooden roof sheathing may be replaced. For new construction, a solid roof deck is installed. It is advisable to inspect the roof deck to make sure all nails are properly installed, dirt and debris are removed and the roof deck is in a clean, broom swept condition.

The pedestaled roof system is then installed onto the roof deck in a three step process. First, the pedestaled sheet may be installed against the roof deck, followed by, second, installing the multi-layer roofing underlayment over the pedestaled sheet. Third, the primary roof covering is installed over the multi-layer roofing underlayment. In another version of the process, first, the multi-layer roofing underlayment may be installed against the roof deck, followed by, second, installing the pedestaled sheet over the multi-layer roofing underlayment. Third, the primary roof covering is installed per manufacture's specifications over the pedestaled sheet.

The pedestaled roof system may be installed in the same manner as installing standard tar paper by starting at the eave of the roof and installing the roll parallel to the eave and horizontally across the roof deck. Each subsequent course is then rolled above the previous course and either butted down to and across the top of the previous course or the roof underlayment attached to the pedestaled sheet overlaps the underlayment on the previous course, depending upon whether the pedestaled sheet is installed first before the multi-layer underlayment or if the multi-layer underlayment is attached to the pedestaled sheet. Vented metal drip edge, eave vents, soffit vents, and or mid roof vents such as, for example, SMART VENT from DCI Products or IN-VENT™ from Cor-a-Ven, Inc. may be installed to allow for continuous intake ventilation into and/or across the pedestaled sheet and the attic space. The primary roof covering is installed per manufacture's specifications over the pedestaled roof underlayment structure. A ridge vent (made by any number of companies) may be installed along the ridge of the roof based upon the type of primary roof covering installed.

When the layered underlayment is installed over the pedestaled sheet, the pedestals may be installed facing up, the multi-layered underlayment should be installed so that a slip resistant layer, if present, is facing upward and the reflective layer, if present, is facing down against the tops of the pedestals of the pedestaled sheet.

In another embodiment, in which the pedestaled sheet includes a pre-attached or partially attached layered underlayment that may include a reflective synthetic underlayment adjacent to the tops of the pedestals (that is, facing down), the pedestaled sheet/underlayment combination is installed over the roof deck with the pedestal projections facing upward (that is, skyward).

In another embodiment, in which the pedestaled sheet and pre-attached or partially attached layered underlayment that may include a reflective synthetic roof underlayment adjacent to the tops of the pedestals (that is, facing down), the pedestaled sheet/underlayment combination is laid over the roof deck with the pedestal projections facing downward (toward the roof deck).

In various embodiments, the pedestaled sheet or the underlayment combined pre-attached to the pedestaled sheet is fastened or affixed to the plywood, OSB or other sheathing material of the roof deck. This may be done by hammering nails through the pedestaled sheet/underlayment combination. The nails may be wide headed to hold the layered underlayment down against the pedestaled sheet and to the roof deck. The nails may be installed through or include a washer made of plastic, metal (made of anodized aluminum), composite or other resilient material that can withstand temperature fluctuations and moisture. The washer allows the nail to hold the layered underlayment down against the pedestaled sheet and to the roof deck. Wide headed staples or staples with a wedge, insulation or washer-like enhancement may also be used to attach the layered underlayment pedestaled sheet combination to the roof deck and to hold the layered underlayment down against the pedestaled sheet and to the roof deck. Screws may be used in place of nails.

A ventilated metal drip edge may be installed at the eave or eaves of the roof. Both the layered underlayment and the pedestaled sheet are typically cut back at ridge and hip details per ventilation manufacture's installation instructions and/or according to the desired finished roof covering type. The primary finished roof covering is then installed on top of (that is, above) the layered underlayment and pedestaled sheet combination. The primary finished roof covering may be fiberglass, asphalt shingles, concrete/clay roof tile, synthetic slate, slate, metal roofing or other roofing material. Hip and ridge vents may then be installed.

In another embodiment, a roof deck material like plywood, OSB board, DENSDECK® and/or other roof sheathing may be installed over the pedestalled sheet prior to installation of the primary finished roof covering. In this application the pedestaled sheet may or may not include the multi-layered underlayment 540. The primary finished roof covering may be fiberglass or organic asphalt shingles, concrete/clay roof tile, synthetic slate, slate, metal roofing systems or other roofing material. Soffit or eave and hip and or ridge vents may be installed in various configurations depending on if a vented or non-vented installation is desired.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to processes and methods, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A pedestaled roof underlayment structure comprising:
a pedestaled sheet including a matrix of individual pedestals integrally formed with the sheet and arranged in rows and columns on a first side of the sheet and a generally flat surface on a second side of the sheet, the second side structured to be laid on a roof deck structure over an attic cavity, each pedestal having a base, a side wall, and a top with a planform shape of one from among circular, triangular, hexagonal, and square, the pedestals separated from one another by a distance in the range from 0.188 inch to 0.40 inch in all directions at the base, the pedestaled sheet formed of material, the top having a hole configured to improve adhesive attachment; and
a multi-layer roofing underlayment above the first side of the pedestaled sheet and configured to attach to the pedestaled sheet with adhesive in the hole of the pedestal and to form an air gap between the pedestaled sheet and the multi-layer roofing underlayment, the air gap extending through and between an area adjacent to the regularly spaced pedestals, the multi-layer roofing underlayment including a slip resistant top layer, a UV protection layer and a strength layer, wherein the slip resistant top layer is non-woven, spun-bond polypropylene or polyester fabric pressed deeply into the UV protection layer with a coefficient of friction to provide a slip-resistant surface while reducing loose fiber detachment, and wherein the strength layer is woven from strands of a thermoplastic polymer, the underlayment including a reflective barrier layer configured to bear against the pedestaled sheet and to reflect thermal radiation and reduce radiant heat transfer into the attic cavity.

2. The pedestaled roof underlayment structure of claim 1 wherein the pedestals are one inch in height on the first side of the pedestaled sheet.

3. The pedestaled roof underlayment structure of claim 1 wherein the multi-layer roofing underlayment is breathable.

4. The pedestaled roof underlayment structure of claim 1 wherein the pedestals have a cross-sectional shape selected from the group including rectangle, conical, and tapered.

5. The pedestaled roof underlayment structure of claim 1 wherein the top of the pedestals is textured to provide a non-slip surface for the underlayment.

6. The pedestaled roof underlayment structure of claim 1 wherein the top of each pedestal includes an indentation.

7. The pedestaled roof underlayment structure of claim 1 wherein the pedestaled sheet is made from at least one selected from the group including high impact polystyrene (HIPS), polyvinyl chloride (PVC), plastic, polyethylene, polystyrene, and polypropylene.

8. The pedestaled roof underlayment structure of claim 1 wherein the pedestaled sheet includes a fire retardant.

9. The pedestaled roof underlayment structure of claim 1 wherein the pedestaled sheet includes a non-slip layer on the second side.

10. The pedestaled roof underlayment structure of claim 1 wherein the pedestaled sheet includes a metalized reflectant coating on either side.

11. The pedestaled roof underlayment structure of claim 1 wherein the multi-layer roofing underlayment is coupled with the first side of the pedestaled sheet.

12. The pedestaled roof underlayment structure of claim 1 wherein the slip resistant top layer is non-woven, spun-bond polypropylene or polyester fabric.

13. The pedestaled roof underlayment structure of claim 1 wherein the UV protection layer is polypropylene.

14. The pedestaled roof underlayment structure of claim 1 wherein the thermoplastic polymer is selected from the group including polypropylene, polyethylene, polyester, nylon, and thermoplastic polyolefin (TPO).

15. The pedestaled roof underlayment structure of claim 1 wherein the multi-layer roofing underlayment further includes a bottom coating applied to the strength layer, the bottom coating comprising a polypropylene coating.

16. The slip-resistant top layer of claim 13 wherein the slip resistant top layer provides an anchor for polyurethane adhesive attachment of roof tiles.

17. A roof of a building having a pedestaled roof underlayment structure, the pedestaled roof underlayment structure comprising:
a pedestaled sheet including a matrix of individual, regularly spaced pedestals on a first side of the sheet and a generally flat surface on a second side of the sheet, the second side structured to be laid on a roof deck structure, each individual pedestal having a base, a tapered side wall, and a top with a circular planform shape having a diameter in the range of 0.25 inch to 0.375 inch and a diameter at the base in the range of 3/8 inch to 15/16 inch, the pedestals separated from one another by a distance in the range from 0.188 inch to 0.40 inch in all directions at the base, the pedestaled sheet formed of material to support the weight of those walking on the underlayment structure, the top having a hole configured to improve adhesive attachment; and a multi-layer roofing underlayment above the first side of the pedestaled sheet and configured to attach to the pedestaled sheet with adhesive in the hole of the pedestal and to form an air gap between the pedestaled sheet and the multi-layer roofing underlayment, the air gap through and between an area adjacent to the regularly spaced pedestals, the multi-layer roofing underlayment including a slip resistant top layer, a UV protection layer and a strength layer, wherein the slip resistant top layer is non-woven, spun-bond polypropylene or polyester fabric pressed deeply into the UV protection layer with a coefficient of friction to provide a slip-resistant surface while reducing loose fiber detachment, and wherein the strength layer is woven from strands of a thermoplastic polymer, the underlayment including a reflective barrier layer configured to bear against the pedestaled sheet and to reflect thermal radiation and reduce radiant heat transfer to the roof deck structure and an underlying attic cavity.

18. The roof of claim 17 wherein the multi-layer roofing underlayment includes a reflective barrier layer.

19. The roof of claim 17 wherein the multi-layer roofing underlayment is breathable.

20. The roof of claim 17 wherein the pedestals have a cross-sectional shape selected from the group including rectangular, conical, and tapered, and each pedestal includes an indentation in the top.

21. The roof of claim 17 wherein the pedestaled sheet is made from at least one selected from the group including high impact polystyrene (HIPS), polyvinyl chloride (PVC), plastic, polyethylene, polystyrene, and polypropylene.

22. The roof of claim 17 wherein the pedestaled sheet includes a fire retardant.

23. The roof of claim 17 wherein the pedestaled sheet includes a metalized reflectant coating on either side.

24. The roof of claim 17 wherein the pedestaled sheet includes a non-slip layer on the second side.

25. The roof of claim 17 wherein the multi-layer roofing underlayment is coupled with the first side of the pedestaled sheet.

26. The roof of claim 17 wherein the slip resistant top layer is non-woven, spun-bond polypropylene or polyester fabric.

27. The roof of claim 17 wherein the UV protection layer is polypropylene.

28. The roof of claim 17 wherein the thermoplastic polymer is selected from the group including polypropylene, polyethylene, polyester, nylon, and thermoplastic polyolefin (TPO).

29. The roof of claim 17 wherein the multi-layer roofing underlayment further includes a bottom coating applied to the strength layer, the bottom coating comprising a polypropylene coating.

* * * * *